US011067169B2

(12) United States Patent
Stepanian

(10) Patent No.: US 11,067,169 B2
(45) Date of Patent: Jul. 20, 2021

(54) AUTOMATIC TRANSMISSION TURBINE SHAFT WITH AN AIR BLEED FOR A ROTATING CLUTCH

(71) Applicant: GM GLOBAL TECHNOLOGY OPERATIONS LLC, Detroit, MI (US)

(72) Inventor: Charles Stepanian, Highland, MI (US)

(73) Assignee: GM Global Technology Operations LLC, Detroit, MI (US)

(*) Notice: Subject to any disclaimer, the term of this patent is extended or adjusted under 35 U.S.C. 154(b) by 78 days.

(21) Appl. No.: 16/436,225

(22) Filed: Jun. 10, 2019

(65) Prior Publication Data
US 2020/0386308 A1 Dec. 10, 2020

(51) Int. Cl.
*F16H 61/4174* (2010.01)
*F16H 61/00* (2006.01)
*F16H 61/14* (2006.01)
*F16H 61/02* (2006.01)

(52) U.S. Cl.
CPC ..... *F16H 61/4174* (2013.01); *F16H 61/0009* (2013.01); *F16H 61/0276* (2013.01); *F16H 61/14* (2013.01); *F16H 2061/004* (2013.01)

(58) Field of Classification Search
CPC ........... F16H 2061/004; F16H 61/4174; F16H 61/0009; F16H 57/0426; F16H 57/043
See application file for complete search history.

(56) References Cited

U.S. PATENT DOCUMENTS

| 3,463,284 | A | * | 8/1969 | Kampert | F16D 25/044 |
| | | | | | 192/48.611 |
| 5,505,287 | A | * | 4/1996 | Asatsuke | F16H 61/0009 |
| | | | | | 137/625.69 |
| 7,955,213 | B2 | * | 6/2011 | Kato | F16H 3/663 |
| | | | | | 475/275 |
| 9,222,526 | B2 | * | 12/2015 | Goleski | F16D 25/0638 |
| 2011/0192691 | A1 | * | 8/2011 | Murata | F16H 45/02 |
| | | | | | 192/3.3 |
| 2017/0130812 | A1 | * | 5/2017 | Maurer | F16H 45/02 |

FOREIGN PATENT DOCUMENTS

WO WO-2011090256 A1 * 7/2011 ......... F16K 31/0613

* cited by examiner

*Primary Examiner* — Ernesto A Suarez
*Assistant Examiner* — Lillian T Nguyen
(74) *Attorney, Agent, or Firm* — Quinn IP Law

(57) ABSTRACT

An automatic transmission assembly for mounting to a power-source includes a torque converter operatively connected to the power-source. The transmission assembly also includes a turbine shaft for receiving power-source torque from the torque converter. The transmission assembly additionally includes a torque transfer system, having a geartrain and a hydraulic pressure operated torque-transmitting device, for receiving the torque from the turbine shaft and selecting an input-to-output speed-ratio of the transmission. The transmission assembly also includes an output member for receiving torque from torque transfer system and outputting the torque to drive a load. The turbine shaft defines a first passage configured to supply hydraulic pressure to the torque-transmitting device and a second passage configured to vent to atmosphere. The turbine shaft additionally defines a third passage fluidly connecting the first passage to the second passage and thereby configured to bleed air from the torque-transmitting device.

20 Claims, 5 Drawing Sheets

AUTOMATIC TRANSMISSION TURBINE SHAFT WITH AN AIR BLEED FOR A ROTATING CLUTCH

INTRODUCTION

The disclosure relates to a turbine shaft with an air bleed for a rotating clutch in a motor vehicle automatic transmission.

Modern motorized vehicles frequently include a powertrain that has an engine and an automatic transmission. Most automatic transmissions include a number of gear elements, generally in the nature of one or more planetary gear sets, for coupling the transmission's input and output shafts. Traditionally, automatic transmissions also include a number of hydraulically actuated torque-transmitting devices, such as clutches and brakes, configured to selectively activate the aforementioned gear elements for establishing desired forward and reverse speed-ratios between the transmission's input and output shafts. A typical automatic transmission also includes a hydraulic circuit with a pump and solenoid valves to control the application of fluid pressure to each of the torque-transmitting devices. The amount of torque transmitted through a typical automatic transmission is therefore dependent on the torque capacity of its torque-transmitting devices, which is in turn proportional to fluid line pressure developed in the hydraulic circuit.

A transmission speed-ratio is generally defined as the transmission input speed divided by the transmission output speed. The transmission input shaft is generally selectively connectable to the vehicle engine, e.g., through a fluid coupling device such as a torque converter, whereas the output shaft is connected through a "drive train" directly to the vehicle wheels. Shifting from one speed-ratio to another is performed in response to engine throttle and vehicle speed, and generally involves releasing one or more "off-going" clutches associated with the current or attained speed-ratio, and applying one or more "on-coming" clutches associated with the desired or commanded speed-ratio.

To perform an "upshift", the transmission transitions from a high speed-ratio to a low speed-ratio, while, conversely, to perform a "downshift", the transmission transitions from a low speed-ratio to a high speed-ratio. An upshift or a downshift may be accomplished by disengaging a clutch associated with the current speed-ratio and contemporaneously engaging a clutch associated with the desired speed-ratio, thereby reconfiguring the gear set to operate at the desired speed-ratio. In order to achieve high quality shifting, shifts performed in the above manner require reliable and precise control of hydraulic pressure supplied to the clutches employed during the shift.

SUMMARY

An automatic transmission assembly for mounting to a power-source and transmitting a power-source torque therefrom includes a torque converter operatively connected to the power-source and configured to transfer the power-source torque relative to a transmission central axis. The automatic transmission assembly also includes a turbine shaft arranged along the transmission central axis and configured to receive the power-source torque from the torque converter. The automatic transmission assembly also includes a torque transfer system configured to receive the power-source torque from the turbine shaft and select an input-to-output speed-ratio of the transmission. The torque transfer system includes a gear-train and a hydraulic pressure operated torque-transmitting device.

The automatic transmission assembly also includes an output member operatively connected to the torque transfer system and configured to receive the power-source torque therefrom and output the power-source torque to drive a load. The turbine shaft defines a first passage configured to supply hydraulic pressure, i.e., feed pressurized oil, to the torque-transmitting device. The turbine shaft also defines a second passage configured to vent to atmosphere. The turbine shaft additionally defines a third passage fluidly connecting the first passage to the second passage and thereby configured to bleed air from the torque-transmitting device.

The first passage may be arranged along the transmission central axis and parallel to the second passage.

The third passage may be arranged perpendicular to the first and second passages.

The automatic transmission assembly may also include a housing configured to support the turbine shaft. In such an embodiment, the torque-transmitting device may be configured to rotate relative to the housing.

The torque-transmitting device may be a multi-plate clutch having a plurality of clutch plates and a plurality of reaction plates.

The torque transfer system may include a rotatable gear transfer shell arranged adjacent the housing and configured to support the plurality of clutch plates.

The automatic transmission assembly may additionally include a rotatable transmission bulkhead configured to support the plurality of reaction plates and defining a fourth passage configured to fluidly connect the first passage to the torque-transmitting device.

The turbine shaft may define a fifth passage arranged perpendicular to the transmission central axis and configured to fluidly connect the fourth passage to the first passage.

The third passage may extend from the fifth passage to the second passage.

The third passage may be a drill passage utilizing the fifth passage for access, and have a diameter in a range of 0.5-1.0 mm.

A vehicle employing the above-discussed automatic transmission assembly mounted externally to a power-source and configured to transmit a power-source torque is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
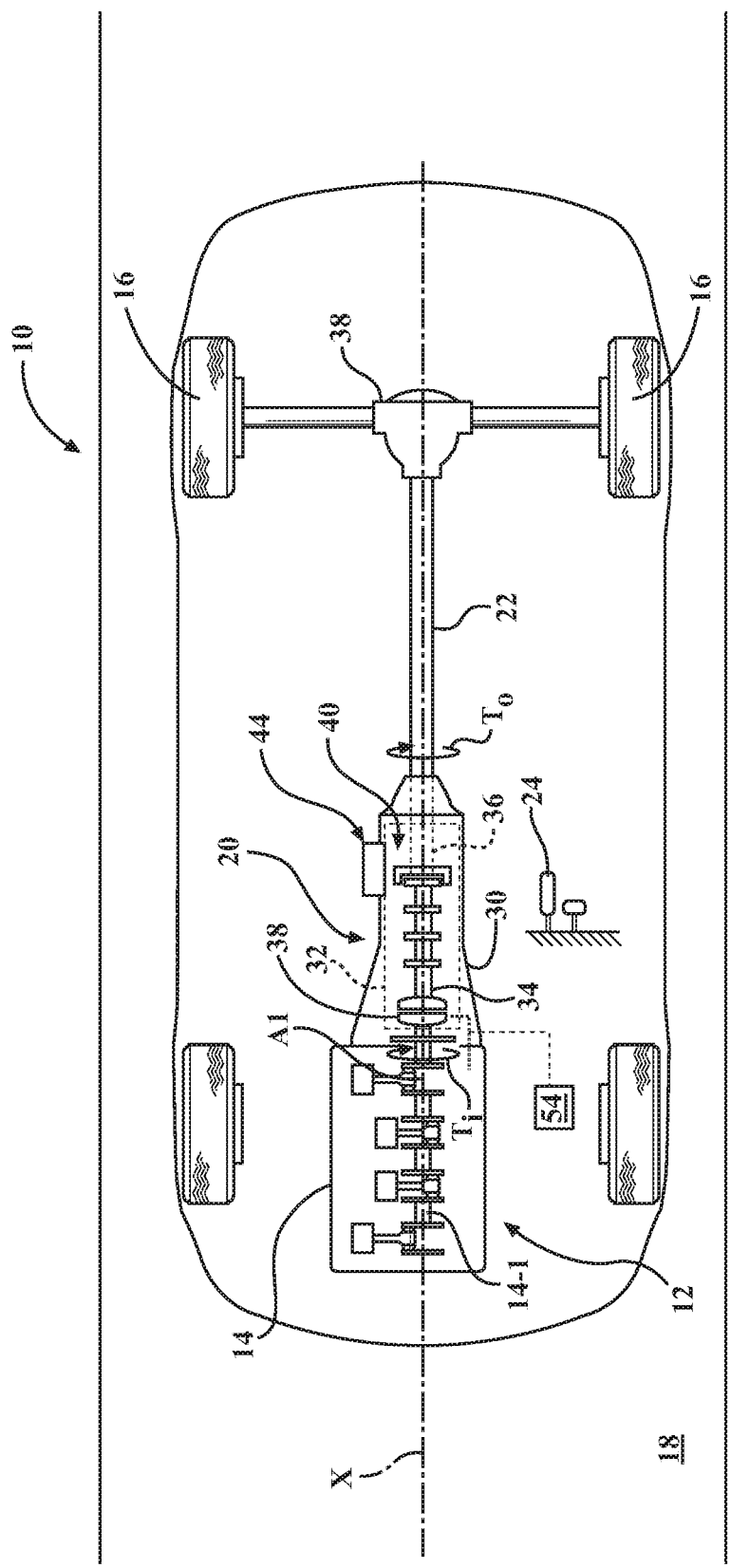
FIG. 1 is a schematic illustration of a vehicle employing a longitudinal powertrain that includes an internal combustion engine connected to an automatic transmission assembly.
Figure 2:
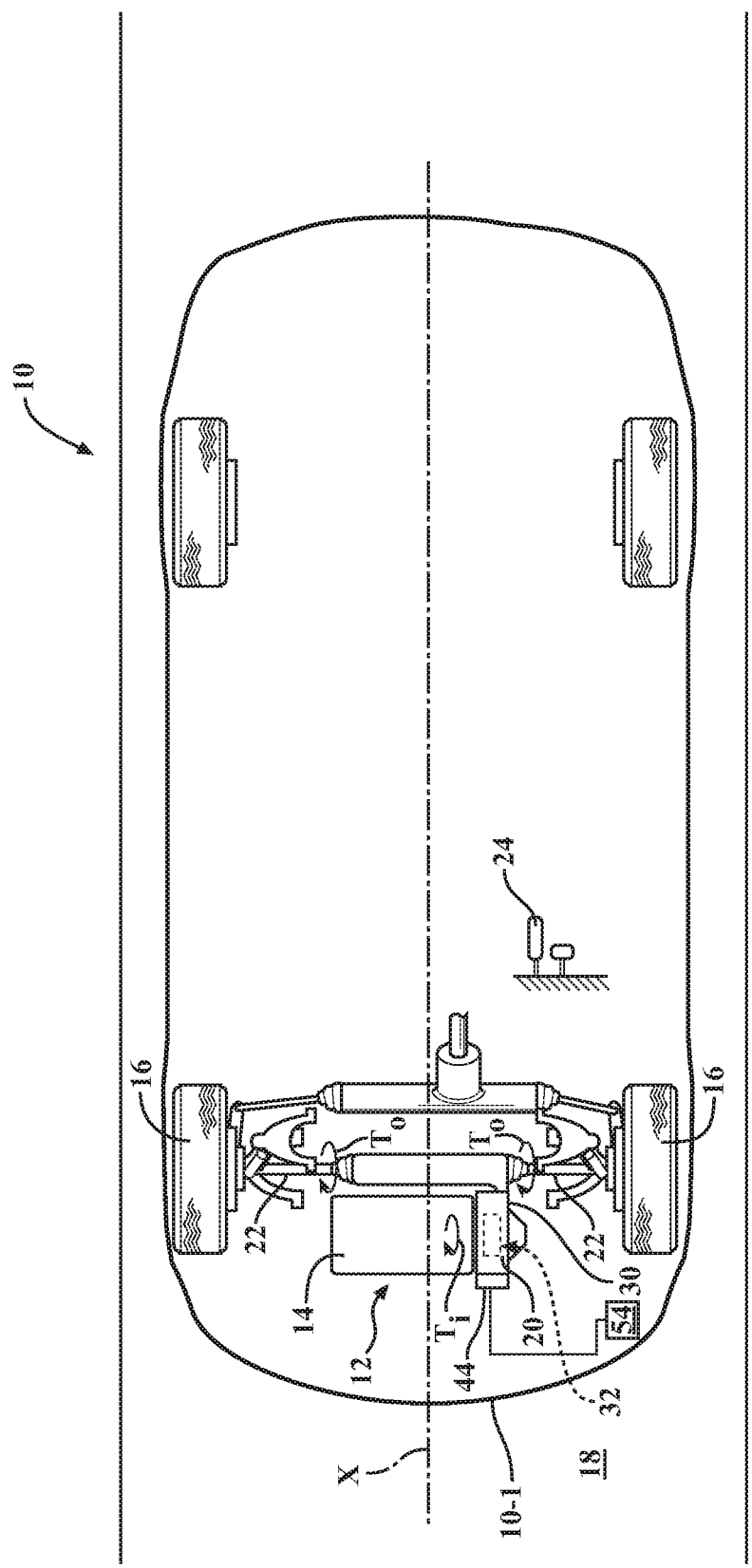
FIG. 2 is a schematic illustration of a vehicle employing a transverse powertrain that includes an internal combustion engine connected to an automatic transmission assembly.

Referring to FIGS. 1-2, a vehicle 10 having a powertrain 12 is depicted. The vehicle 10 may include, but not be limited to, a commercial vehicle, industrial vehicle, passenger vehicle, aircraft, watercraft, train or the like. It is also contemplated that the vehicle 10 may be a mobile platform, such as an airplane, all-terrain vehicle (ATV), boat, personal movement apparatus, robot and the like to accomplish the purposes of this disclosure.

The powertrain 12 includes a power-source 14 configured to generate torque $T_i$ (shown in FIGS. 1-2) for propulsion of the vehicle 10 via driven wheels 16 relative to a road surface 18. The powertrain 12 also includes a multiple speed-ratio automatically-shiftable, a.k.a., automatic, transmission assembly 20. The powertrain 12 may be mounted transversely in the vehicle 10 along a general axis X, i.e., at approximately 90 degrees relative to a longitudinal axis Y of the vehicle, wherein the transmission assembly 20 is configured as a transaxle—a transmission assembly combined with a differential or final-drive assembly. Such a transverse mounting of the powertrain 12 is frequently employed for packaging purposes in front-wheel-drive (FWD) vehicles, where vehicle drive wheel(s) 16 are arranged proximate a front end 10-1 of the vehicle 10. Alternatively, the powertrain 12 may be mounted longitudinally in the vehicle 10, along the Y axis. Such a longitudinal mounting of the powertrain 12 is frequently employed in rear-wheel-drive (RWD), where the drive wheel(s) 16 are arranged proximate a rear end 10-2 of the vehicle 10, or in four-wheel-drive (4WD) vehicles, where respective drive wheel(s) 16 are arranged proximate each of the front and rear ends 10-1, 10-2 of the vehicle.

In some vehicle configurations, the powertrain 12 may be mounted longitudinally in the vehicle 10, i.e., substantially aligned with the longitudinal axis X of the vehicle (shown in FIG. 1). In other vehicle configurations, the powertrain 12 may be mounted transversely in the vehicle 10, i.e., at approximately 90 degrees relative to the longitudinal axis X of the vehicle (shown in FIG. 2). Such a transverse mounting of the powertrain 12 is frequently employed for packaging purposes in front-wheel-drive (FWD) vehicles, where the drive wheel(s) 16 are arranged proximate a front end of the vehicle 10. In such vehicle configurations, the automatic transmission assembly 20 may be combined with a final drive assembly and is generally described as a transaxle. Although the longitudinal transmission embodiment of the automatic transmission assembly 20 is specifically referred to below, the disclosure is also applicable to transaxle configurations of the automatic transmission assembly 20.

The automatic transmission assembly 20 is operatively connected to the power-source 14, i.e., externally mounted to the power-source and configured to transfer the torque $T_i$ generated by the power-source to the driven wheels 16. The transmission assembly 20 is further configured to receive and then selectively multiply, reduce, or leave unmodified the torque $T_i$ to achieve a resultant transmission output torque $T_o$ (shown in FIGS. 1-2) for driving the vehicle 10. As shown in FIGS. 1-2, the driven wheels 16 may be operatively connected to the transmission assembly 20, such as via drive- or half-shaft(s) 22, and configured to receive the transmission output torque $T_o$. A vehicle accelerator 24, such as a pedal or a lever, is provided for the vehicle operator to control the power-source torque $T_i$ for driving the vehicle 10.

The power-source 14 may include an internal combustion engine, a fuel-cell, and/or an electric motor (not shown) mounted in the vehicle 10 and having the automatic transmission assembly 20 mounted externally thereto. However, for conciseness and clarity, the present disclosure will concentrate on the embodiment of the power-source 14 that includes solely the internal combustion engine. Accordingly, although the numeral 14 should be seen as generally attributable to such embodiments of the envisioned powertrain, for the remainder of the present disclosure, the numeral 14 will be used to denote the specific embodiment of the powertrain having solely the internal combustion engine. As such, the power-source input torque $T_i$ will be hereinafter referenced as engine 14 torque. As shown, the particular engine 14 may include a crankshaft 14-1 for converting reciprocal motion of its pistons 14-2 into rotational motion and generating the input torque $T_i$.

Figure 3:
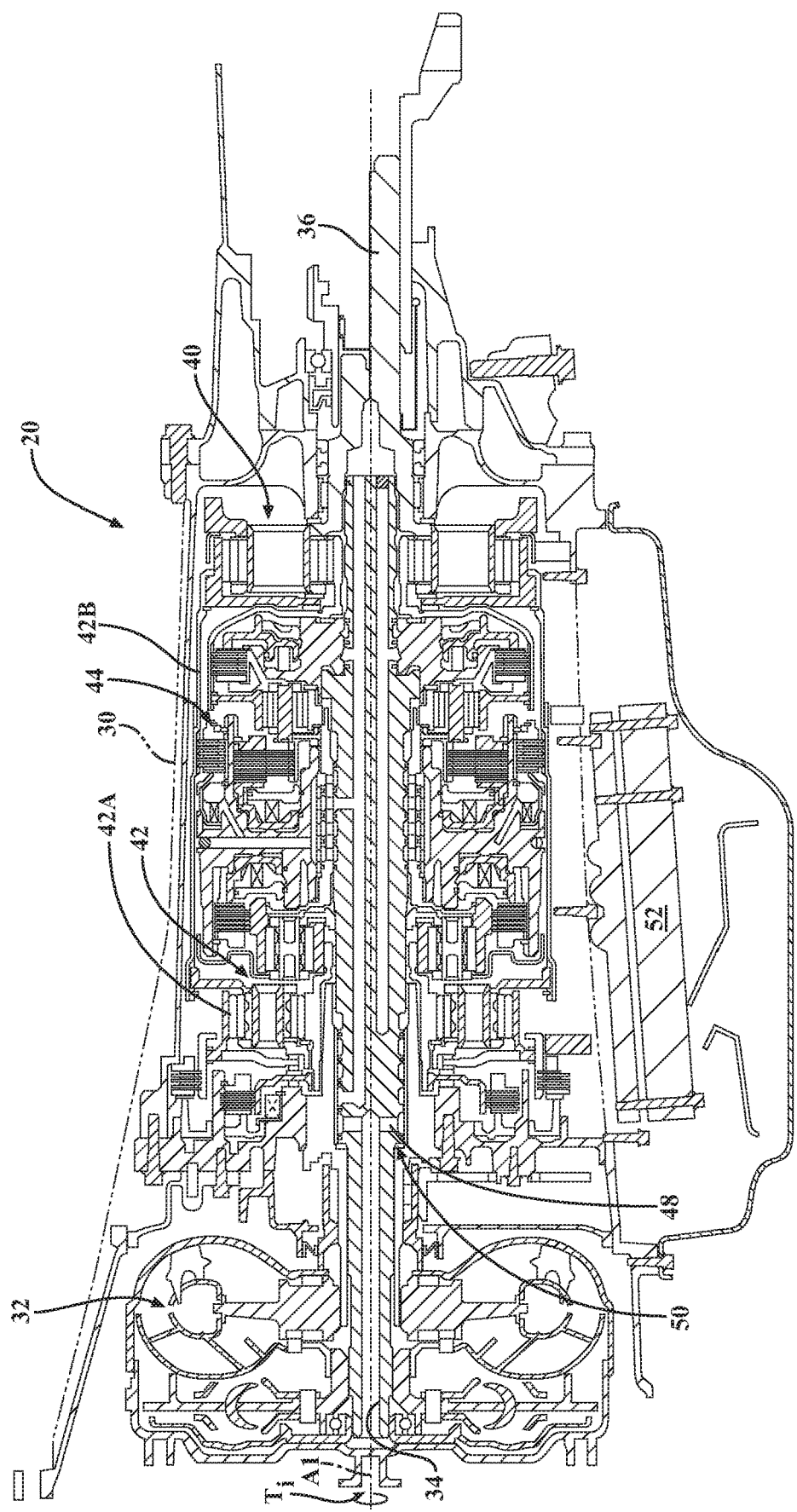
FIG. 3 is a schematic cross-sectional plan view of the automatic transmission assembly shown in FIGS. 1 and 2, according to the disclosure.

As shown in FIG. 3, the transmission assembly 20 includes a transmission housing or case 30 for retaining and supporting a fluid coupling 32, a.k.a., a torque converter. The torque converter 32 is operatively connected to the power-source 14 and configured to receive and transfer the power-source torque $T_i$ relative to a transmission central axis A1. The transmission assembly 20 also includes input and output members supported by the housing 30. Specifically, the input member of the transmission assembly is a turbine shaft 34 arranged along the transmission central axis A1 and configured to receive the power-source torque $T_i$ from the torque converter 32. The output member is a shaft specifically identified via numeral 36 and may be connected through a differential assembly 38 (shown in FIG. 1) to output the power-source torque $T_i$ to drive a load, i.e., power the drive wheel(s) 16.

The housing 30 also retains and supports a torque transfer system 40 configured to couple the turbine shaft 34 and the output shaft 36. Specifically, the torque transfer system 40 is configured to receive the power-source torque $T_i$ from the turbine shaft 34 and select an input-to-output speed-ratio of the transmission assembly 20. A transmission speed-ratio is generally defined as the transmission input speed divided by the transmission output speed. The output shaft 36 is operatively connected to the torque transfer system 40, configured to receive the power-source torque $T_i$ therefrom, and output the power-source torque to drive a load, i.e., power the vehicle 10 via the drive wheels 16.

The torque transfer system 40 includes a gear-train 42 generally including a number of gear elements arranged on the transmission central axis A1, for example one or more planetary or epicyclic gear-sets 42A (shown in FIG. 3). The gear-train 42 is configured to couple the turbine shaft 34 and the output shaft 36, and provide a predetermined number of selectable speed-ratios. As shown, the gear-train 42 is arranged along the transmission central axis A1. As shown, the gear-train 42 may also include a rotatable generally cylindrical gear transfer shell 42B arranged proximate and radially adjacent to the housing 30. Generally, the gear transfer shell 42B is configured to operatively connect respective components of individual planetary gear-sets 42A for affecting specific speed-ratios and establishing a flow of the power-source torque $T_i$ across the torque transfer system 40. Accordingly, as shown, an outer diameter $D_S$ of the gear transfer shell 42B is greater than outer dimensions of the planetary gear-sets 42A components connected thereby.

The torque transfer system 40 also includes a number of torque-transmitting devices arranged on the transmission central axis A1 and operated or actuated by hydraulic pressure, i.e., a pressurized hydraulic fluid such as oil. Such hydraulically actuated torque-transmitting devices are selectively engageable to activate the aforementioned gear elements 42A for establishing desired forward and reverse speed-ratios between the transmission's turbine and output shafts 34, 36. As shown, a particular torque-transmitting device 44 is arranged radially adjacent the gear transfer shell 42B and configured to rotate relative to the housing 30. The torque-transmitting device 44 may be a multi-plate clutch with an outer diameter $D_C$, and specifically having a plurality of clutch plates 44A interspaced with a plurality of reaction plates 44B. The clutch plates 44A are configured to be engaged with the reaction plates 44B by an application of force from a clutch piston 44C, which is actuated by the pressurized hydraulic fluid received through a system of fluid passages to be discussed in detail below. The clutch plates 44A are specifically configured as friction plates using specially designed material to provide desired friction coefficient for positive engagement with reaction plates 44B when immersed in transmission fluid.

As shown, the gear transfer shell 42B splines or keys thereto and supports the plurality of clutch plates 44A. Accordingly, the specific torque-transmitting device 44 may have the greatest outer diameter $D_C$ in comparison with other torque-transmitting devices in the particular transmission assembly 20, i.e., the subject torque-transmitting device 44 may be the largest of the torque-transmitting devices. However, since the torque-transmitting device 44 is housed within the gear transfer shell 42B, the outer diameter $D_C$ of the subject torque-transmitting device is smaller than the outer diameter $D_S$ of the gear transfer shell. The automatic transmission assembly 20 may further include a rotatable transmission bulkhead 46. As shown in FIG. 3, the bulkhead 46 is configured to spline thereto and support the plurality of reaction plates 44B. Accordingly, the torque-transmitting device 44 is configured to rotate with the gear-train 42 relative to the case 30, while the engagement of the interspaced clutch plates 44A and reaction plates 44B via the clutch piston 44C rotationally couples the respective gear transfer shell 42B and the bulkhead 46. A hydraulic circuit, indicated generally by numeral 48 in FIG. 3, is arranged inside the transmission 20 and configured to circulate the hydraulic fluid throughout the torque transfer system 40. Specifically, the hydraulic circuit 48 lubricates elements of the gear-train 42, and is also employed to actuate the torque-transmitting devices, including the torque-transmitting device 44 by feeding the piston 44C to engage the clutch and reaction plates 44A, 44B.

During operation of the transmission 20, as various components of the torque transfer system 40 rotate relative to the transmission central axis A1, the fluid residing in the hydraulic circuit 48 rotating with such components tends to migrate toward the outer diameter of the transmission case 30 due to centrifugal force acting on the fluid mass. In the situation of rotating torque-transmitting devices, the fluid residing in the hydraulic circuit 48 feeding the respective devices tends to displace air trapped in that part of the hydraulic circuit toward the transmission central axis A1. However, retention of such air in the part of the hydraulic circuit 48 feeding a torque-transmitting device introduces compressibility into the hydraulic fluid and resultant loss of efficiency into actuation of the subject device. As rotational speed of a torque-transmitting device increases, more of the air trapped inside in the part of the hydraulic circuit 48 tends to concentrate proximate the transmission central axis A1. Accordingly, it is desirable to evacuate the trapped air out of the pressurized path of the hydraulic circuit 48 feeding torque-transmitting devices to maintain efficiency in actuation of the subject torque-transmitting devices.

The hydraulic circuit 48 includes a hydraulic pump 50 driven by the torque converter 32. The hydraulic pump 50 is configured to supply a pressurized fluid at a specific fluid line pressure to the transmission's torque-transmitting devices including the torque-transmitting device 44, thus generating a hydraulic force for actuating the clutch piston 44C. Typically, the hydraulic circuit 48 also includes a plurality of solenoids and control valves arranged inside a transmission valvebody 52, and various fluid passages arranged thoughout the transmission 20. The hydraulic circuit 48 is configured to control delivery of the pressurized fluid to the torque-transmitting devices, such as the torque-transmitting device 44, to thereby engage a specific torque-transmitting device and select a desired speed-ratio in the transmission 20.

An electronic controller 54 (shown in FIGS. 1 and 2), such as a powertrain control module (PCM), is in operative communication with the hydraulic circuit 48, and configured to command the hydraulic circuit to establish appropriate fluid line pressure to thereby apply a hydraulic force to the clutch piston 44C. In turn, the hydraulic force displaces the clutch piston 44C relative to the clutch plates 44A and reaction plates 44B to engage the torque-transmitting device 44 and thereby affect a specific shift between speed-ratios in the transmission 20. In general, increasing the fluid line pressure acts to reduce an amount of time required to build or generate the hydraulic force, while, conversely, decreasing the line pressure acts to increase the amount of time required to generate the hydraulic force. Typically, the electronic controller 54 uses signals from various sensors (not shown) connected to the engine 14, the transmission 20, and other vehicle systems, to determine when and how to shift between speed-ratios in the transmission.

Figure 4:
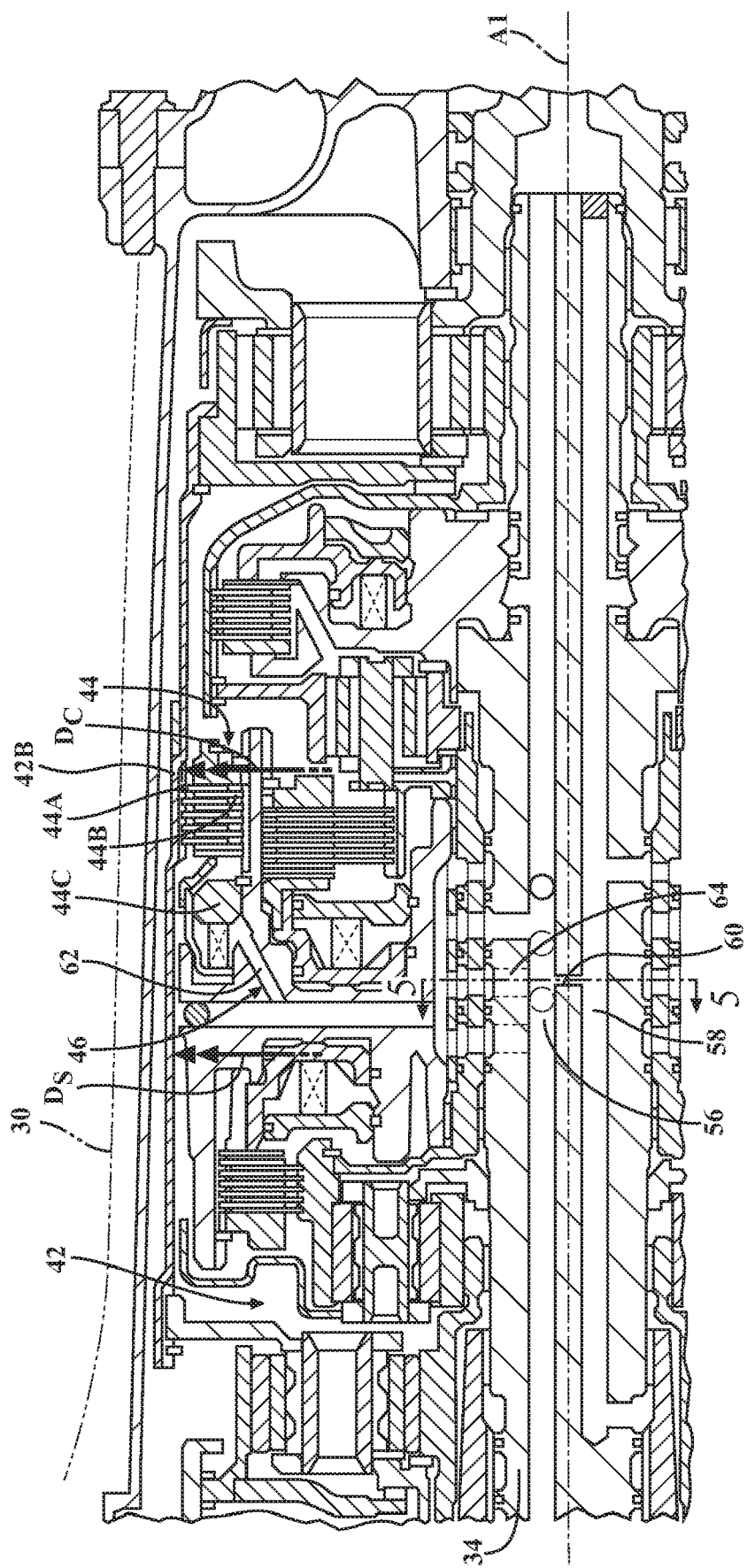
FIG. 4 is a schematic close-up cross-sectional plan view of a portion of the automatic transmission assembly shown in FIG. 3, depicting a torque transfer system employing a gear-train and a hydraulic pressure operated torque-transmitting device, according to the disclosure.
Figure 5:
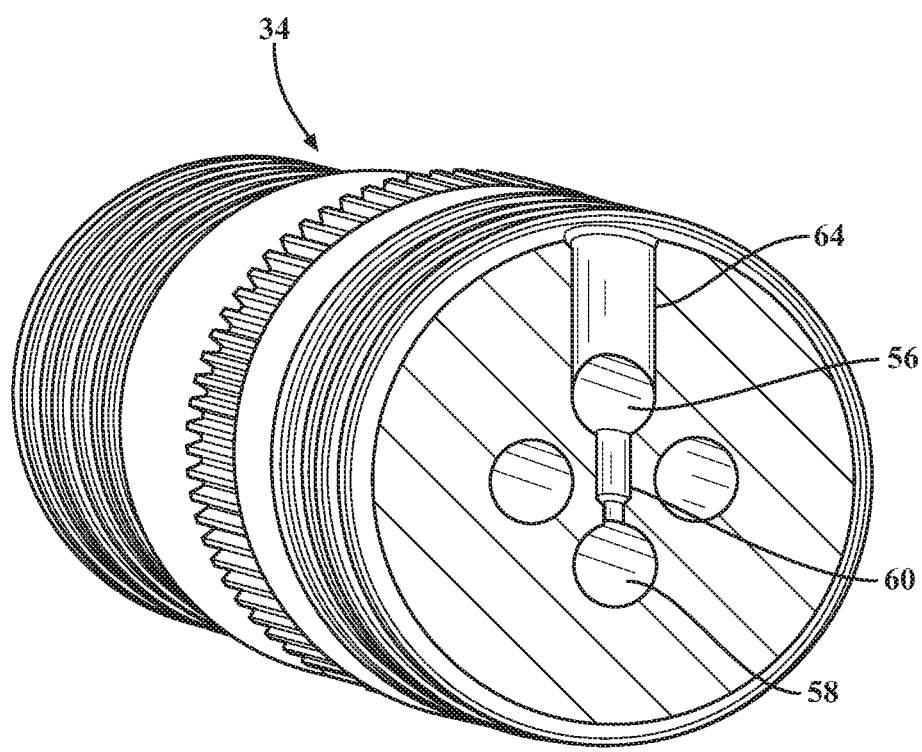
FIG. 5 is a schematic close-up cross-sectional perspective view of the turbine shaft of the automatic transmission assembly shown in FIG. 4, depicting a passage configured to bleed air from the torque-transmitting device, according to the disclosure.

As shown in FIGS. 3 and 4, the turbine shaft 34 defines a first passage 56 configured to supply hydraulic pressure, i.e., feed the pressurized fluid, to the torque-transmitting device 44. The turbine shaft 34 also defines a second passage 58 configured to vent the fluid at low pressure to atmosphere, e.g., atmospheric pressure inside the housing 30. As shown, the first passage 56 is arranged along the transmission central axis A1 and substantially parallel to the second passage 58. Furthermore, the turbine shaft 34 defines a third passage 60. The third passage 60 fluidly connects the first passage 56 to the second passage 58, and is thereby configured to bleed air from the torque-transmitting device 44. Relationship of the third passage 60 with respect to the first passage 56 and the second passage 58 is depicted in in FIG. 5. Specifically, FIG. 5 shows a cross-sectional view of the turbine shaft 34, wherein the direction of the cross-sectional view is denoted by arrows 5 in FIG. 4.

As additionally shown, the bulkhead 46 defines a fourth passage 62 configured to fluidly connect the first passage 56 to the torque-transmitting device 44. Additionally, the turbine shaft 34 defines a fifth passage 64 arranged perpendicular to the transmission central axis A1 and configured to fluidly connect the fourth passage 62 to the first passage 56. As shown, the third passage 60 extends from the fifth passage 64 to the second passage 58. Furthermore, the third passage 60 is arranged substantially perpendicular to each of the first and second passages 56, 58 and along the fifth passage 64. The third passage 60 may be drilled through between the first passage 56 and the second passage 58 using the fifth passage 64 for access. In a specific embodiment, the third passage 60 may have a diameter in a range of 0.5-1.0 mm.

During operation of the rotating torque-transmitting device 44, the fluid residing in the fourth and fifth passages 62, 64 of the hydraulic circuit 48 tends to migrate toward the outer diameter $D_C$. Such movement of the fluid toward the outer diameter $D_C$ of the torque-transmitting device 44 also tends to displace air trapped in that part of the hydraulic circuit 48 toward the transmission central axis A1. The air thus concentrates in the first and fifth passages 56, 64 near the transmission central axis A1. The specific location of the third passage 60 then permits the trapped pressurized air to bleed from the first passage 56 to the relatively lower pressurized fluid inside the second passage 58 and out to atmosphere inside the housing 30. Accordingly, the third passage 60 permits evacuation of the air trapped inside the fourth and fifth passages 62, 64 of the hydraulic circuit 48 and thus maintains efficiency of actuation of the torque-transmitting device 44.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. An automatic transmission assembly for connecting to a power-source and transmitting a power-source torque therefrom, the automatic transmission assembly comprising:
    a torque converter operatively connected to the power-source, and configured to receive and transfer the power-source torque relative to a transmission central axis;
    a turbine shaft arranged along the transmission central axis and configured to receive the power-source torque from the torque converter;
    a torque transfer system configured to receive the power-source torque from the turbine shaft and select an input-to-output speed-ratio of the automatic transmission assembly, wherein the torque transfer system includes a gear-train and a hydraulic pressure operated torque-transmitting device; and
    an output member operatively connected to the torque transfer system and configured to receive the power-source torque therefrom and output the power-source torque to drive a load;
    wherein the turbine shaft defines:
        a first passage configured to supply hydraulic pressure to the torque-transmitting device;
        a second passage configured to vent to atmosphere; and
        a third passage fluidly connecting the first passage to the second passage and thereby configured to bleed air from the torque-transmitting device.

2. The automatic transmission assembly according to claim 1, wherein the first passage is arranged along the transmission central axis and parallel to the second passage.

3. The automatic transmission assembly according to claim 1, wherein the third passage is arranged perpendicular to the first and second passages.

4. The automatic transmission assembly according to claim 1, further comprising a housing configured to support the turbine shaft, wherein the torque-transmitting device is configured to rotate relative to the housing.

5. The automatic transmission assembly according to claim 4, wherein the torque-transmitting device is a multi-plate clutch having a plurality of clutch plates and a plurality of reaction plates.

6. The automatic transmission assembly according to claim 5, wherein the torque transfer system includes a rotatable gear transfer shell arranged adjacent the housing and configured to support the plurality of clutch plates.

7. The automatic transmission assembly according to claim 6, further comprising a rotatable transmission bulkhead configured to support the plurality of reaction plates and defining a fourth passage configured to fluidly connect the first passage to the torque-transmitting device.

8. The automatic transmission assembly according to claim 7, wherein the turbine shaft defines a fifth passage arranged perpendicular to the transmission central axis and configured to fluidly connect the fourth passage to the first passage.

9. The automatic transmission assembly according to claim 8, wherein the third passage extends from the fifth passage to the second passage.

10. The automatic transmission assembly according to claim 1, wherein the third passage has a diameter in a range of 0.5-1.0 mm.

11. A vehicle comprising:
    a power-source configured to generate a power-source torque;
    an automatic transmission assembly mounted externally to the power-source and configured to transmit the power-source torque;
    a drive wheel configured to receive the power-source torque transmitted by the automatic transmission assembly;
    wherein the automatic transmission assembly includes:
        a torque converter operatively connected to the power-source, and configured to receive and transfer the power-source torque relative to a transmission central axis;
        a turbine shaft arranged along the transmission central axis and configured to receive the power-source torque from the torque converter;
        a torque transfer system configured to receive the power-source torque from the turbine shaft and select an input-to-output speed-ratio of the automatic transmission assembly, wherein the torque transfer system includes a gear-train and a hydraulic pressure operated torque-transmitting device; and
        an output member operatively connected to the torque transfer system and configured to receive the power-source torque therefrom and output the power-source torque to drive a load;
        wherein the turbine shaft defines:
            a first passage configured to supply hydraulic pressure to the torque-transmitting device;

a second passage configured to vent to atmosphere; and a third passage fluidly connecting the first passage to the second passage and thereby configured to bleed air from the torque-transmitting device; and a differential assembly operatively connected to the output member to thereby power the drive wheel via the power-source torque.

12. The vehicle according to claim 11, wherein the first passage is arranged along the transmission central axis and parallel to the second passage.

13. The vehicle according to claim 11, wherein the third passage is arranged perpendicular to the first and second passages.

14. The vehicle according to claim 11, wherein:

the automatic transmission assembly additionally includes a housing configured to support the turbine shaft; and the torque-transmitting device is configured to rotate relative to the housing.

15. The vehicle according to claim 14, wherein the torque-transmitting device is a multi-plate clutch having a plurality of clutch plates and a plurality of reaction plates.

16. The vehicle according to claim 15, wherein the torque transfer system includes a rotatable gear transfer shell arranged adjacent the housing and configured to support the plurality of clutch plates.

17. The vehicle according to claim 16, wherein the automatic transmission assembly additionally includes a rotatable transmission bulkhead configured to support the plurality of reaction plates and defining a fourth passage configured to fluidly connect the first passage to the torque-transmitting device.

18. The vehicle according to claim 17, wherein the turbine shaft defines a fifth passage arranged perpendicular to the transmission central axis and configured to fluidly connect the fourth passage to the first passage.

19. The vehicle according to claim 18, wherein the third passage extends from the fifth passage to the second passage.

20. The vehicle according to claim 11, wherein the third passage has a diameter in a range of 0.5-1.0 mm.

* * * * *